United States Patent [19]
Gardner, Jr.

[11] Patent Number: 6,017,617
[45] Date of Patent: Jan. 25, 2000

[54] DECORATIVE AUTOMOTIVE INTERIOR TRIM ARTICLES WITH INTEGRAL LIGHT STABLE POLYURETHANE ELASTOMER COVERING AND PROCESS FOR MAKING THE SAME

[75] Inventor: John A. Gardner, Jr., Deerfield, N.H.

[73] Assignee: Atoma International, Inc., Ontario, Canada

[21] Appl. No.: 09/210,981

[22] Filed: Dec. 15, 1998

Related U.S. Application Data

[62] Division of application No. 08/790,291, Jan. 31, 1997, Pat. No. 5,885,662.

[51] Int. Cl.⁷ .................................................. B32B 5/14
[52] U.S. Cl. .................... 428/309.9; 428/304.4; 428/315.9; 428/317.5; 428/318.8; 428/319.3; 428/321.1; 428/423.1; 428/423.3; 427/421; 427/426; 264/250; 264/267; 264/328.18
[58] Field of Search ............................ 428/304.4, 315.9, 428/317.5, 318.8, 319.3, 321.1, 309.9, 423.1, 423.3; 427/426, 421; 264/328.18, 267, 250, 46.4

[56] References Cited

U.S. PATENT DOCUMENTS

| T100,701 | 6/1981 | Kuehn | 428/422.8 |
|---|---|---|---|
| 1,889,905 | 12/1932 | Saeger | 164/14 |
| 4,195,148 | 3/1980 | Hagen | 524/753 |
| 4,285,897 | 8/1981 | Zakaria et al. | 264/130 |
| 4,294,880 | 10/1981 | Nishida | 428/318.8 |

(List continued on next page.)

FOREIGN PATENT DOCUMENTS

| 0379246 | 7/1990 | European Pat. Off. . |
|---|---|---|
| 0392285 | 10/1990 | European Pat. Off. . |
| 0425240 | 5/1991 | European Pat. Off. . |
| 0744264 | 11/1996 | European Pat. Off. . |
| 383608 | 3/1973 | U.S.S.R. . |
| 2079667 | 1/1982 | United Kingdom . |
| 880087 | 2/1988 | WIPO . |
| 93/23237 | 11/1993 | WIPO . |
| 9323237 | 11/1993 | WIPO . |
| 9510633 | 4/1995 | WIPO . |
| 9532850 | 12/1995 | WIPO . |

OTHER PUBLICATIONS

Patent Abstracts of Japan vol. 96, No. 7, Mar. 1996 re JP–08–071177.
"Elastogran France: Nouveau Procede Panneaus de Portes", Ingenieurs de 'Automobile, No. 676, Oct. 1, 1992, p. 63.

*Primary Examiner*—Deborah Jones
*Assistant Examiner*—Abraham Bahta
*Attorney, Agent, or Firm*—Pillsbury Madison & Sutro Intellectual Property Group

[57] ABSTRACT

An article including a panel-like structure constructed to be mounted in an automobile vehicle to form a part of the interior thereof, and a process for making the same. According to this process, an outer layer defining at least a portion of the exposed exterior surface of the structure is prepared by applying a water-dispersed thermoplastic polyurethane composition and a heat-activated reactive crosslinking monomer onto a mold surface and thereafter drying the composition. Next, a rapidly reacting composition is sprayed onto an inner surface of the outer layer while the outer layer is retained on the mold surface to form a polyurethane elastomer inner layer that is interfacially chemical bonded to the outer layer. The inner layer with the outer layer interfacially chemically bonded thereto is then united with the rigid substrate so that the rigid substrate serves to reinforce the outer layer. The exposed exterior surface of the panel-like structure simulates the appearance and feel of authentic leather, while the inner layer and an optional semi-rigid polyurethane cellular foam intermediate layer provide a compressing feel to the exposed portion of the outer layer.

11 Claims, 6 Drawing Sheets

U.S. PATENT DOCUMENTS

| | | | |
|---|---|---|---|
| 4,312,672 | 1/1982 | Blahak et al. | 106/35.22 |
| 4,350,777 | 9/1982 | Henrichs et al. | 521/110 |
| 4,520,042 | 5/1985 | Smith | 427/209 |
| 4,592,887 | 6/1986 | Bando et al. | 264/337 |
| 4,668,460 | 5/1987 | Ongena | 264/255 |
| 4,822,549 | 4/1989 | Verwilst et al. | 264/250 |
| 4,825,974 | 5/1989 | Hoffmann et al. | 181/290 |
| 5,051,310 | 9/1991 | Horn et al. | 428/423 |
| 5,071,683 | 12/1991 | Verwilst et al. | 427/420 |
| 5,082,609 | 1/1992 | Rohrlach et al. | 264/46.4 |
| 5,115,048 | 5/1992 | Maeda et al. | 525/457 |
| 5,130,402 | 7/1992 | Akiyama et al. | 528/45 |
| 5,154,871 | 10/1992 | Wagner et al. | 264/255 |
| 5,207,961 | 5/1993 | Wank et al. | 264/135 |
| 5,223,193 | 6/1993 | Bianchin et al. | 264/45.7 |
| 5,284,918 | 2/1994 | Huynh-Tran et al. | 525/124 |
| 5,338,788 | 8/1994 | Miyataka et al. | 524/197 |
| 5,387,390 | 2/1995 | Kornylo | 264/46.8 |
| 5,387,750 | 2/1995 | Chiang | 528/52 |
| 5,397,409 | 3/1995 | Kornylo | 156/79 |
| 5,523,337 | 6/1996 | Banerjee et al. | 523/436 |
| 5,580,501 | 12/1996 | Gallagher et al. | 264/45.3 |
| 5,662,996 | 9/1997 | Jourquin et al. | 428/318.8 |

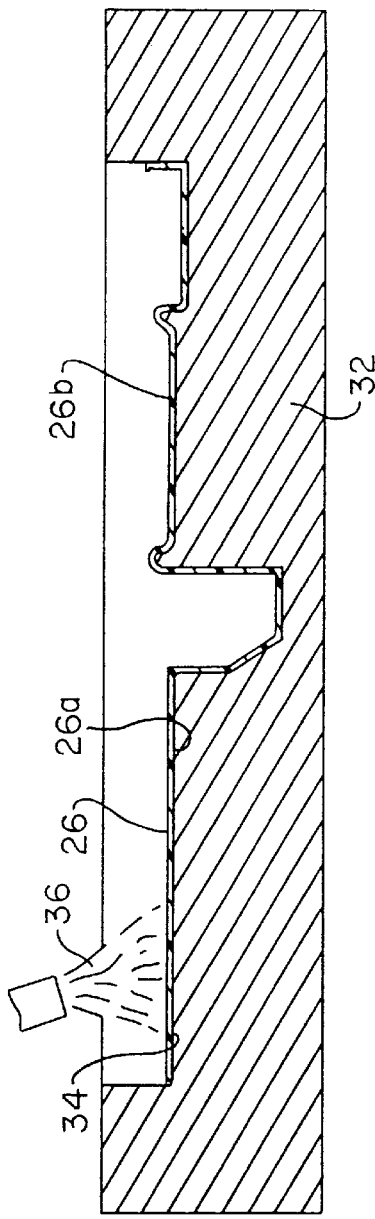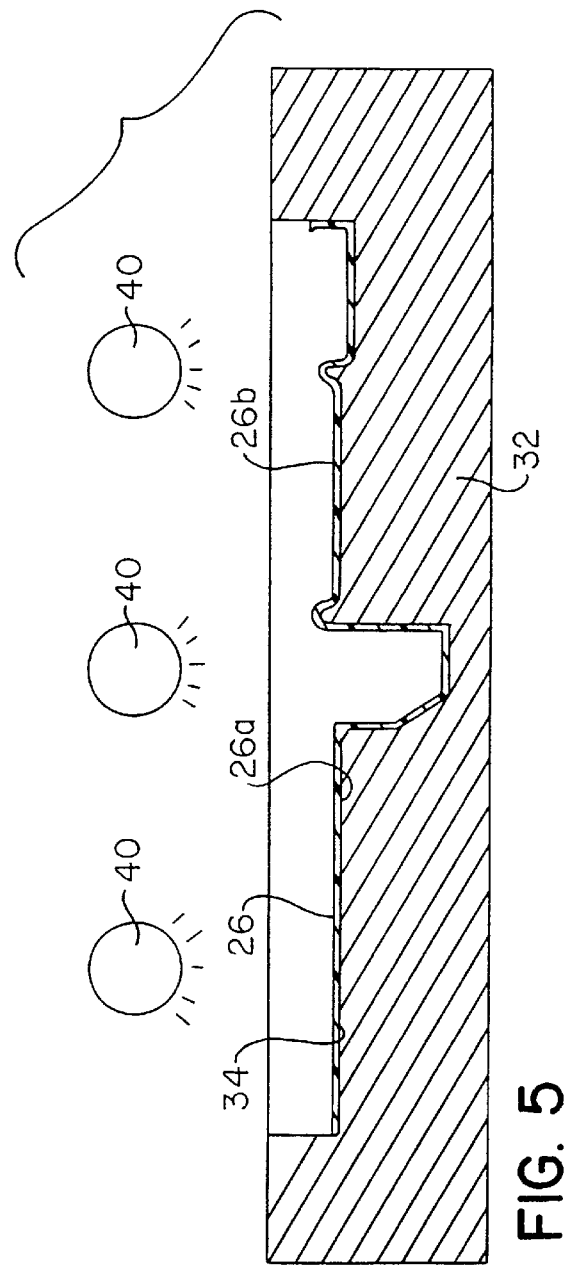

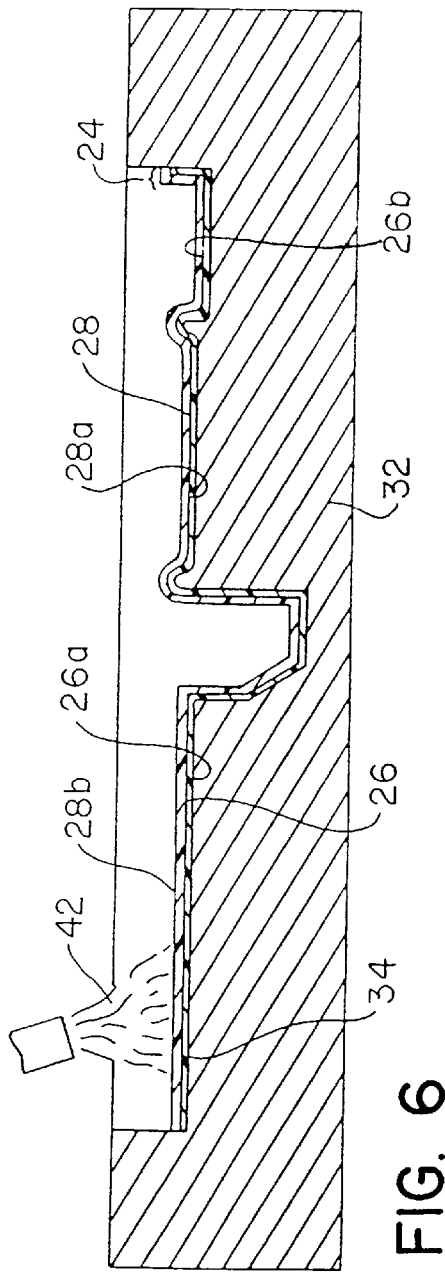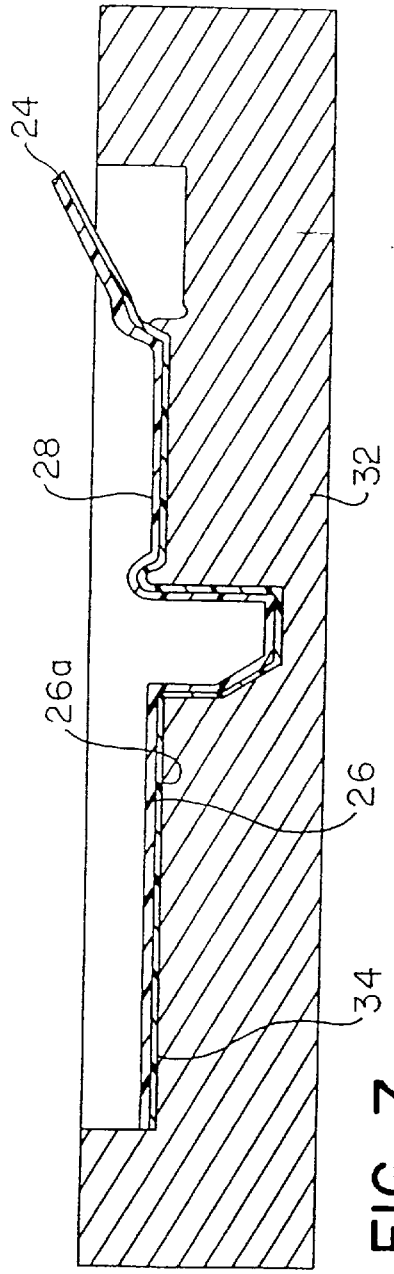

DECORATIVE AUTOMOTIVE INTERIOR TRIM ARTICLES WITH INTEGRAL LIGHT STABLE POLYURETHANE ELASTOMER COVERING AND PROCESS FOR MAKING THE SAME

This is a division of application Ser. No. 08/790,291, filed Jan. 31, 1997, now U.S. Pat. No. 5,885,662.

BACKGROUND OF THE INVENTION

1. Field of Invention

The present invention relates to automotive interior trim articles containing a panel-like structure constructed to be mounted in an automobile vehicle to form a part of the interior thereof, and in particular to automobile interior trim articles such as instrument panels, door panels, and glove compartment doors. The present invention further relates to a process for making the aforementioned automotive interior trim articles.

2. Description of Related Art

Automotive interior trim articles such as instrument panels, door panels, armrests, headrests, floor consoles, knee bolsters, and glove compartment doors conventionally have been constructed by applying a soft decorative covering over a rigid substrate mountable in an automobile vehicular body, with a cellular polyurethane padding interposed between the decorative covering and rigid substrate. A predetermined texture and color is usually provided to the decorative covering in an effort to simulate the appearance and feel of authentic leather.

The preparation of a self-supporting synthetic automotive interior trim article having a dual layer decorative covering is disclosed in international application WO 93/23237 to Recticel, and in particular at Example 2 thereof. In accordance with the method disclosed in WO 93/23237 for preparing this interior trim article, a solvent-dispersed polyurethane lacquer is initially applied to an open mold surface as an "in-mold paint", and then is dried by evaporating off the solvent. A "skin" prepared from a two-part polyurethane elastomer is thereafter formed on the surface of the dried in-mold paint by employing specialized nozzles and application systems. In practice, suitable spray nozzles and systems that can be employed are disclosed in U.S. Pat. Nos. 5,028,006 and 5,071,683. Next, a polyurethane cellular foam layer is prepared by spraying a polyurethane reaction mixture against the polyurethane elastomer skin. Finally, a polyurethane or polyisocyanurate reaction mixture is applied against the opposing surface of the polyurethane cellular foam layer to obtain a rigid synthetic carrier.

The commercial merit of this related art dual layer covering containing the in-mold paint disclosed in WO 93/23237, and the process for making the same, is negligible, as evidenced by the current commercial activity of Recticel, the owner of WO 93/23237. Recticel does not utilize an in-mold solvent-based lacquer in its commercial activity. Recticel has even proscribed its customers from using its in-mold paint.

Further, the provision of the solvent-based lacquer as the in-mold paint plagues the preparatory method disclosed in WO 93/23237 with several complications and inefficiencies. For example, these lacquers contain large amounts of volatile organic compounds (VOCs). Due to the extremely flammable and explosive nature of VOCs, such lacquers are subject to strict governmental regulations. Compliance with these governmental regulations often requires additional and expensive equipment designed to ensure worker safety and to protect against environmental pollution. For example, manufacturing facilities equipped for handling such lacquers must include special spray equipment, separate and customized spraying zones, and air cleansing equipment. Workers must also dress in special protective and often bulky and cumbersome gear that is fire resistant and shields against exposure to noxious fumes.

A need therefore exists to provide a process for making a panel-like structure containing a multi-layered decorative covering in which the panel-like structure can be produced in a more efficient and cost effective manner, and in which the resulting panel-like structure has a high quality, leather-like appearance.

SUMMARY OF THE INVENTION

It is, therefore, an object of the present invention to solve the aforementioned problems associated with the related art as well as the need expressed above. In accordance with the principles of the present invention, this objective is obtained by providing a process for making a panel-like structure adaptable for mounting to an automobile vehicle to form a part of the interior thereof. The panel-like structure includes an outer layer defining an exterior surface of the structure, at least a portion of which outer layer is exposed to the vehicle interior, and a rigid substrate defining an interior surface of the structure. The substrate is hidden from the vehicle interior when the panel-like structure is mounted in the automobile vehicle.

According to one embodiment of this process, at least the following steps are performed to prepare the panel-like structure. First, a water-dispersed composition comprising at least one light-stable aliphatic thermoplastic polyurethane containing one or more pendent hydroxyl and/or carboxyl functional groups, a desired coloring agent, and a heat-activated reactive crosslinking monomer is applied onto a heated mold surface shaped to define a corresponding configuration of the outer layer. The heat-activated reactive crosslinking monomer is preferably carbodiimide. The light-stable thermoplastic polyurethane and the heat-activated reactive crosslinking monomer are heated, preferably by pre-heating the mold surface, and reacted to crosslink the thermoplastic polyurethane with the reactive crosslinking monomer. Second, the water-dispersed composition is substantially dried while on the mold surface to form the exposed outer layer with an exterior surface, at least a portion of which has the desired touch, color, and configuration of the panel-like structure. Third, a rapidly reacting composition containing at least one polyisocyanate and at least one polyol is sprayed onto an inner surface of the outer layer while on the mold surface to form an inner layer which comprises a polyurethane elastomer crosslinked with the polyurethane of the outer layer via unreacted functional groups of the heat-activated reactive crosslinking monomer in the outer layer. Consequently, interfacial chemical bonding is obtained between the inner surface of the outer layer and an adjacent surface of the inner layer. Fourth, the inner layer with the outer layer interfacially chemically bonded thereto is united with the rigid substrate so that the rigid substrate serves to reinforce the outer layer. Optionally, a soft cellular polyurethane foam layer can be formed intermediate the inner layer and the rigid substrate. Consequently, the panel-like structure retains the touch and color of the exposed portion and the compressing feel provided to the outer layer by the inner layer and the optional soft cellular foam intermediate layer.

Another object of the present invention is the provision of an automotive interior trim article containing a panel-like structure made by the method of the present invention, and in particular the provision of a panel-like structure having an exterior surface which simulates the appearance and feel of authentic leather.

In accordance with the principles of the present invention, this objective is achieved by providing an article comprising a panel-like structure adaptable to be mounted in an automobile vehicle to form a part of the interior thereof. The panel-like structure has an exterior surface exposed to the vehicle interior and an interior surface which is hidden from the vehicle interior when the panel-like structure is mounted to the automobile vehicle structure. The panel-like structure comprises a rigid substrate and layered composition structure, with a soft cellular polyurethane foam layer optionally interposed therebetween. The rigid substrate has one surface defining the interior surface of the panel-like structure, and an opposite surface which is united with the layered composite structure. The layered composite structure comprises an outer layer and an inner layer. The outer layer defines at least a portion of the exposed exterior surface of the panel-like structure, and has the desired touch, color, and configuration of the panel-like structure, as well as exhibiting good chemical resistance. The outer layer comprises a substantially dried, light-stable, crosslinked polyurethane formulated from a water-dispersed composition comprising at least one desired coloring agent, at least one light-stable aliphatic thermoplastic polyurethane containing one or more pendent hydroxyl and/or carboxyl functional groups, and a heat-activated reactive crosslinking monomer. The heat-activated reactive crosslinking monomer is preferably carbodiimide. The light-stable aliphatic thermoplastic polyurethane and the heat-activated reactive crosslinking monomer are heated to thereby produce a crosslinking reaction and molded on a heated mold surface shaped to define a corresponding configuration of the outer layer, and then are dried on the mold surface. The inner layer, which is thicker than the outer layer, comprises a polyurethane elastomer formulated from a rapidly reacting composition containing at least one polyisocyanate and at least one polyol. The heat-activated reactive crosslinking monomer serves to crosslink the polyurethane elastomer with the light-stable polyurethane of the outer layer. Consequently, the inner layer has a surface adjacent to and interfacially chemically bonded with an inner surface of the outer layer. The interfacial chemical bonds are formed by spraying the rapidly reacting composition onto the inner surface of the outer layer while the outer layer is retained on the mold surface. The rigid substrate serves to reinforce the outer layer while retaining the touch and color of the exposed portion and the compressing feel provided to the outer layer by the inner layer and the optionally interposed soft cellular polyurethane foam.

The composite provided in accordance with this embodiment exhibits excellent chemical, scuff and mar resistance to external influences. Further, appropriate additives can be introduced into the composite to provide the composite with the non-reflective and low gloss surface appearance desired for such panel-like structures. Furthermore, both the inner and outer layers of the composite are characterized by excellent extensibility, such that the composite can withstand indentation and flexure during use without causing cracking in the outer layer over a wide temperature range, such as from −30° C. to 80° C.

The principles of the present invention enunciated above are applicable to all types of panel-like structures, but have particular applicability to instrument panels (also referred to as dashboards) and door panels. Moreover, the principles of the present invention are applicable to various types of vehicles, including passenger cars, trucks, vans, utility vehicles, and others.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWING

The accompanying drawings illustrate the present invention. In such drawings:

FIG. 4 is a sectional view of a mold surface showing a step of applying a water-dispersed polyurethane composition to the mold surface while heated to form a crosslinked light-stable polyurethane outer layer in accordance with the present invention;

FIG. 5 is a sectional view similar to FIG. 4 showing a step of drying the polyurethane outer layer;

FIG. 6 is a sectional view similar to FIG. 5 showing a step of obtaining an inner layer by spraying a rapidly reacting composition onto an inner surface of the outer layer while the outer layer is retained on the mold surface;

FIG. 7 is a sectional view similar to FIG. 6 showing a step of removing the combination of the inner and outer layers from the mold surface;

DESCRIPTION OF THE PREFERRED EMBODIMENTS

Figure 1:
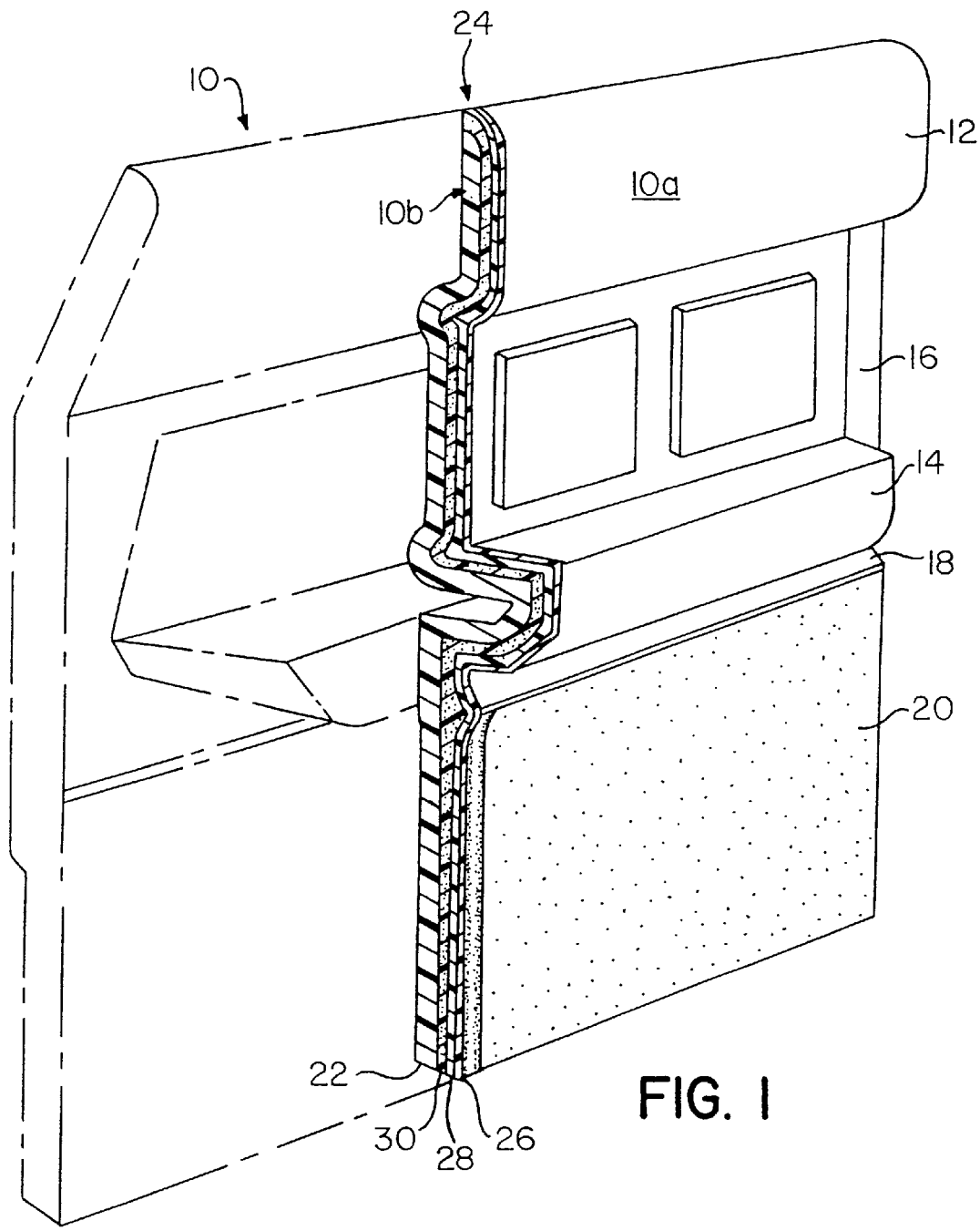
FIG. 1 is a perspective, partially sectioned and partially phantomed view of a completed vehicle door panel constructed in accordance with the present invention.

Referring now more particularly to the drawings, there is shown in FIG. 1 a panel-like structure comprising a vehicle door panel, generally designated by reference numeral 10, made by a method according to the principles of the present invention. The door panel 10 includes a window sill upper portion 12 and an arm rest portion 14 defining therebetween a bolster receiving portion 16. A lower planar rug receiving portion 18 having a rug section 20 connected thereto is disposed below the arm rest portion 14.

As shown in cross-section in FIG. 1, the panel-like structure 10 has an exterior surface 10a exposed to the vehicle interior and an interior surface 10b which is hidden from the vehicle interior when the panel-like structure 10 is mounted in the automobile vehicle. The panel-like structure 10 includes a rigid substrate 22 having one surface defining the interior surface 10b of the panel-like structure 10. The panel-like structure 10 further includes a layered composite structure, generally designated by reference numeral 24, comprising an outer layer 26 defining at least a portion of the exposed exterior surface 10a of the panel-like structure 10 and an inner layer 28. At least a portion of the outer layer 26 is exposed to the vehicle interior, while a portion of the outer layer may be hidden from view by a decorative or masking item. For example, in FIG. 1, the lower planar rug receiving portion 18 of the outer layer 26 is covered by the rug section 20 and, therefore, is not exposed to the vehicle interior.

As illustrated in FIG. 1, the inner layer 28, which is relatively thick in comparison to the outer layer 26, has an outer surface 28a adjacent to and interfacially chemically bonded with an inner surface 26b of the outer layer 26. As further illustrated in FIG. 1, the rigid substrate 22, which is hidden from the vehicle interior when the panel-like structure 10 is mounted in the automobile vehicle, reinforces the outer and inner layers 26 and 28. Finally, an intermediate layer 30 containing a relatively rigid (or semi-rigid) polyurethane cellular foam filler is interposed between the inner layer 28 and the rigid substrate 22.

As shown in FIG. 4, the method of the present invention utilizes a first mold component or part 32 having a first mold surface 34. The first mold component 32 preferably is formulated by conducting an electrolytic nickel deposition process over a rigid cast epoxy substrate which is secondarily removed at the end of the deposition/plating process to yield a self-supporting mold capable of being mounted and controlled in a tooling module. The first mold surface 34 is shaped to define a configuration that substantially corresponds to the desired configuration of the outer layer 26, and is grained to define a texture that substantially complements the desired texture of the outer layer 26 and simulates real leather FIG.

FIG. 4 illustrates the first step in the present invention and, in accordance with this step, the outer layer 26 is obtained by applying, preferably by spraying, a water-dispersed composition 36 onto the first mold surface 34. The water-dispersed composition comprises at least one light-stable aliphatic thermoplastic polyurethane containing one or more pendent hydroxyl and/or carboxyl functional groups, at least one desired coloring agent, and at least one heat-activated reactive crosslinking monomer. Carbodiimide (H—N=C=N—H), also known as cyanamide, preferably serves as the heat-activated reactive crosslinking monomer. Other suitable crosslinking monomers, such as aziridine, can also be used.

Application of the water-dispersed composition 36 onto the heated first mold surface 34 induces chemical reaction between the one or more pendent hydroxyl and/or carboxyl functional groups of the light-stable thermoplastic polyurethane and the heat-activated reactive crosslinking monomer to thereby produce a crosslinked light-stable polyurethane. The first mold surface 34 should be heated to a sufficient temperature to drive the crosslinking reaction, but should not be so high as to cause delamination of the composition 36 from the mold surface 34. Preferably, the first mold surface 34 is heated to a temperature in a range of from about 140° F. (60° C.) to about 160° F. (71.1° C.). The heating of the first mold surface 34 to such elevated temperatures prior to application of the water-dispersed composition 36 thereto also serves to melt and disperse mold releasing agents, such as microcrystalline wax mold releasing agents, applied to the first mold surface 34. The mold releasing agent is thereby prevented from transferring in the intricate grain detail of the first mold surface 34.

The water-dispersed composition 36 can be prepared by withdrawing the light-stable aliphatic thermoplastic polyurethane and the heat-activated reactive crosslinking monomer from separate storage chambers in continuous, metered streams, and mixing these constituents immediately prior to contact with the first mold surface 34. Alternatively, the light-stable aliphatic thermoplastic polyurethane and the carbodiimide constituents can be stably premixed, or "hot-potted", for up to about 24 hours at room temperature before application. This technique is known as "hot-potting" since the thermoplastic polyurethane and carbodiimide slowly react with each other at room temperature in a pressure pot. If the admixture is hot-potted for more than about 24 hours at room temperature before application onto the first mold surface 34, the resulting crosslinked light-stable polyurethane exhibits inferior solvent and wear resistance properties and extensibility.

Once the crosslinked light-stable polyurethane has been formed on the first mold surface 34, the water-dispersed composition 36 now containing the crosslinked light-stable polyurethane is substantially dried while being retained on the first mold surface 34 to obtain the outer layer 26. As shown in FIG. 5, the crosslinked light-stable polyurethane can be subjected to a heat source 40 to induce evaporation of the water and solvent therefrom and form the outer layer 26 with an outer surface 26a adjacent to the first mold surface 34. Although not shown in FIG. 5, such heat source 40 is preferably integrated with the first mold 32, and preferably heats the first mold surface 34 to an elevated temperature of about 150° F. (65.9° C.) or higher. At least a portion of the outer surface 26a of the outer layer 26 has the desired touch, color, and grain-like configuration of the panel-like structure 10. Generally, the outer layer 26 has a thickness in a range of from about 1.0 mils to about 1.5 mils (that is, from about 0.001 inch to about 0.0015 inch; or from about 0.0025 cm to about 0.0038 cm).

The particular coloring agent selected can directly influence the desired thickness of the outer layer 26. Darker colors, such as grays and greens, usually only require a relatively small film thickness to mask the color of the hidden inner layer 28, whereas lighter colors such as reds and yellows usually dictate the provision of a relatively larger thickness to obtain an opaque, non-transparent outer layer 26 that conceals the inner layer 28 from view.

Next, the polyurethane elastomer inner layer 28, as depicted in FIG. 6, is formed by spraying a rapidly reacting composition 42 onto the inner surface 26b of the outer layer 26 while the outer layer 26 is retained on the first mold surface 34 in a substantially anhydrous state. The rapidly reacting composition 42 contains at least one polyisocyanate and at least one polyol, which react with each other to form the polyurethane elastomeric inner layer 28. As referred to herein, the term elastomer encompasses any flexible polymer composition stretchable under moderate tension and having a relatively high tensile strength and memory so that, upon release of the tension, the elastomer retracts into and recovers its original dimensions or dimensions substantially similar to its original dimensions.

In addition to being reactive with the polyisocyanate constituent, the polyol constituent of the rapidly reacting composition 42 can contain one or more pendent hydroxyl and/or carboxyl functional groups that are highly reactive with unreacted functional groups of carbodiimide in the outer layer 26 that have not reacted with the pendent functional groups of the polyurethane of the outer layer 26. Unreacted functional groups of the carbodiimide penetrate into the inner layer 28 and react with the pendent functional groups of the polyol constituent. As a result, the carbodiimide crosslinks the polyurethane of the outer layer 26 with the polyurethane elastomer of the inner layer 28 and thereby forms an interfacial chemical bond between the inner surface 26b of the outer layer 26 and the adjacent outer surface 28a of the inner layer 28. The layered composite structure 24 is thus obtained. If the crosslinking is performed under optimum crosslinking conditions, the boundary between the outer and inner layers 26 and 28 of the layered composite structure 24 can become visually indistinct, such that a transition phase appears at the interface of the two layers. As referred to herein, interfacial chemical bonding encompasses, but is not limited to, such crosslinking reactions in which the interfacial boundary between the outer and inner layers 26 and 28 is visually indistinct and inseparable.

Generally, provisions should be taken to ensure that an adequate interfacial chemical bond is achieved between the inner surface 26b of the outer layer 26 and the adjacent outer surface 28a of the inner layer 28. For example, once the carbodiimide is activated by heat, the crosslinking reaction between the carbodiimide and the pendent hydroxyl and/or carboxyl reactive groups of the thermoplastic polyurethane goes to completion within minutes, leaving substantially no residual reactive sites in the carbodiimide for crosslinking the polyurethane of the outer layer 26 with the polyol constituent of the rapidly reacting composition 42. Therefore, the rapidly reacting composition 42 generally should be sprayed within six minutes, and preferably within two to four minutes, of completing the application of the water-dispersed composition 36 to the first mold surface 34. Significant delays in spraying the rapidly reacting composition 42 also can cause the outer layer 26 to constrict and delaminate from the first mold surface 34. As a consequence of delamination, the outer layer 26 will not have a shape that corresponds to the configuration of the first mold surface 34, and the entire composite 24 will have to be disposed of as scrap.

On the other hand, if the thermoplastic polyurethane of the water-dispersed composition 36 is not given sufficient time to crosslink before the rapidly reacting composition 42 is sprayed thereon, the polyol component of the rapidly reacting composition 42 can undergo a condensation reaction with unreacted hydroxyl and/or carboxyl pendent functional groups of the polyurethane of the outer layer 26 to form ester or ether linkages, respectively. While some formation of these linkages can advantageously enhance the interfacial chemical bond, the condensation reactions release water, which in excess amounts can act as a blowing agent and undesirably increase the porosity of the inner layer 28 and interfere with the interfacial chemical bond.

The interfacial chemical bond is further enhanced by separately storing the highly reactive polyol and polyisocyanate constituent components of the rapidly reacting composition 42 in separate storage chambers and spraying these components on the inner surface 26b of the outer layer 26 so as to avoid contact between these components until spraying is conducted. A suitable dual nozzle spraying mechanism for accomplishing this task is disclosed in U.S. Pat. Nos. 5,028,006 and 5,071,683. By keeping these components separate until immediately prior to spraying, a portion of the polyol reacts with the carbodiimide (and the hydroxyl and/or carboxyl pendent functional groups of the thermoplastic polyurethane) before all of the polyol can completely react with the polyisocyanate.

Furthermore, given the hygroscopic nature of the polyisocyanate constituent of the rapidly reacting composition 42, it is important that the outer layer 26 and the surrounding atmosphere (e.g., humidity levels) be substantially anhydrous during this spraying step in order to obtain a strong interfacial chemical bond. While small amounts of moisture may be retained in the outer layer 26, the concentration of such moisture should not be so great as to permit the water to substantially interfere with the reaction between the polyol and polyisocyanate constituents of the rapidly reacting composition 42. Undesirable reactions between the water and the polyisocyanate can disrupt the stoichiometric balance between the polyol and the polyisocyanate, leaving localized unreacted polyol deposits behind on the layered composite structure 24. The water also can serve as a blowing agent, reacting with the polyisocyanate to release carbon dioxide which imparts a cellular structure to the inner layer 28. Excess amounts of water also can deleteriously interfere with the crosslinking reaction effected via the polyol and the residual reactive sites of the carbodiimide reactive crosslinking monomer.

The rapidly reacting composition 42 is preferably applied to the inner surface 26a of the outer layer 26 at an elevated temperature to advance these objectives. Suitable temperatures to which the first mold component 32 can be heated range, by way of example and without limitation, from about 140° F. (60°C.) to about 160° F. (71.1° C.).

Generally, the inner layer 28 can have a thickness in a range of from about 40 mils to about 60 mils (that is, from about 0.040 inch to about 0.060 inch; or from about 0.10 cm to about 0.15 cm).

FIG. 7 illustrates the next step of the present invention. As shown in FIG. 7, the layered composite structure 24 is demolded (i.e., removed) from the first mold surface 34. The demolding process is often a relatively labor intensive, tedious, and time consuming task. Formation of tears in or undue stretching of the layered composite structure 24 during demolding can irreversibly ruin and thereby necessitate disposal of the layered composite structure 24 as scrap. Such demolding problems and inefficiencies are largely overcome by practice of the present invention, since the interfacial chemical bond between the outer layer 26 and inner layer 28 strengthens the layered composite structure 24 by discouraging separation of the outer and inner layer 26 and 28 during demolding procedures.

To enhance the releasibility from the first mold surface 34 further, the mold surface 34 can be pretreated with a releasing agent. Exemplary releasing agents include, without limitation, high molecular weight microcrystalline wax mold releases, such as Chem-Trend PRC 7140, supplied by Chem-Trend, Inc. of Howell, Mich., or PRC 2006, also supplied by Chem-Trend. These mold releasing agents dry quickly on a heated mold within about 5 to about 10 seconds and form a release barrier between the grained mold surface 34 and the outer layer 26. Care should be taken to avoid the accumulation of the mold releasing agent on the first mold surface 34 or excess solids content in the agent, since such accumulation or excess solids content tends to fill the interstices of the decorative, grained mold surface 34, thereby removing from the exterior surface of the panel-like structure 10 the appearance of the intricate, hair-like grained configuration of the mold surface 34. Further, the use of excess mold releasing agents can cause the agents to transfer from the first mold surface 34 to the layered composite structure 24 during demolding of the composite structure 24, thus requiring additional wash-removal and drying steps after demolding and hence a loss in productivity.

After being demolded from the first mold surface 34, the layered composite structure 24, including the combination of the outer and inner layers 26 and 28, can be examined for defects with a light source (not shown) while the layered composite structure 24 is positioned on a transparent substrate (not shown). Such defects usually are present as cosmetic blemishes in the outer layer 26, and may include the presence of tears and rupturable portions lacking sufficient thicknesses to withstand stresses associated with demolding or the further processing steps, especially the uniting step. If minor and isolated, such localized defects can be remedied by post application of additional water-dispersed composition 36 onto the outer layer 26. Additionally, minor tears or thin areas can be repaired using thermoplastic, heat formable polyurethane tape on the backside 28b of the layered composite structure 24. Advantageously, the need to scrap the entire layered composite structure 24 is thereby averted. As a cautionary note, however, post application spray repair of surface 26a is generally undesirable and its use should be minimized to correcting localized defects, since post application spray repair can negate the grained leather-like appearance of the outer surface 26a of the outer layer 26 which is transcribed from the first mold surface 34.

As discussed in further detail below, the steps of demolding and examining of the layered composite structure 24 from the first mold surface 34 are not required to be conducted immediately subsequent to the formation of the layered composition structure 24. For example, the layered composite structure 24 optionally can be maintained against the first mold surface 34 until completion of the panel-like structure 10.

Figure 8:
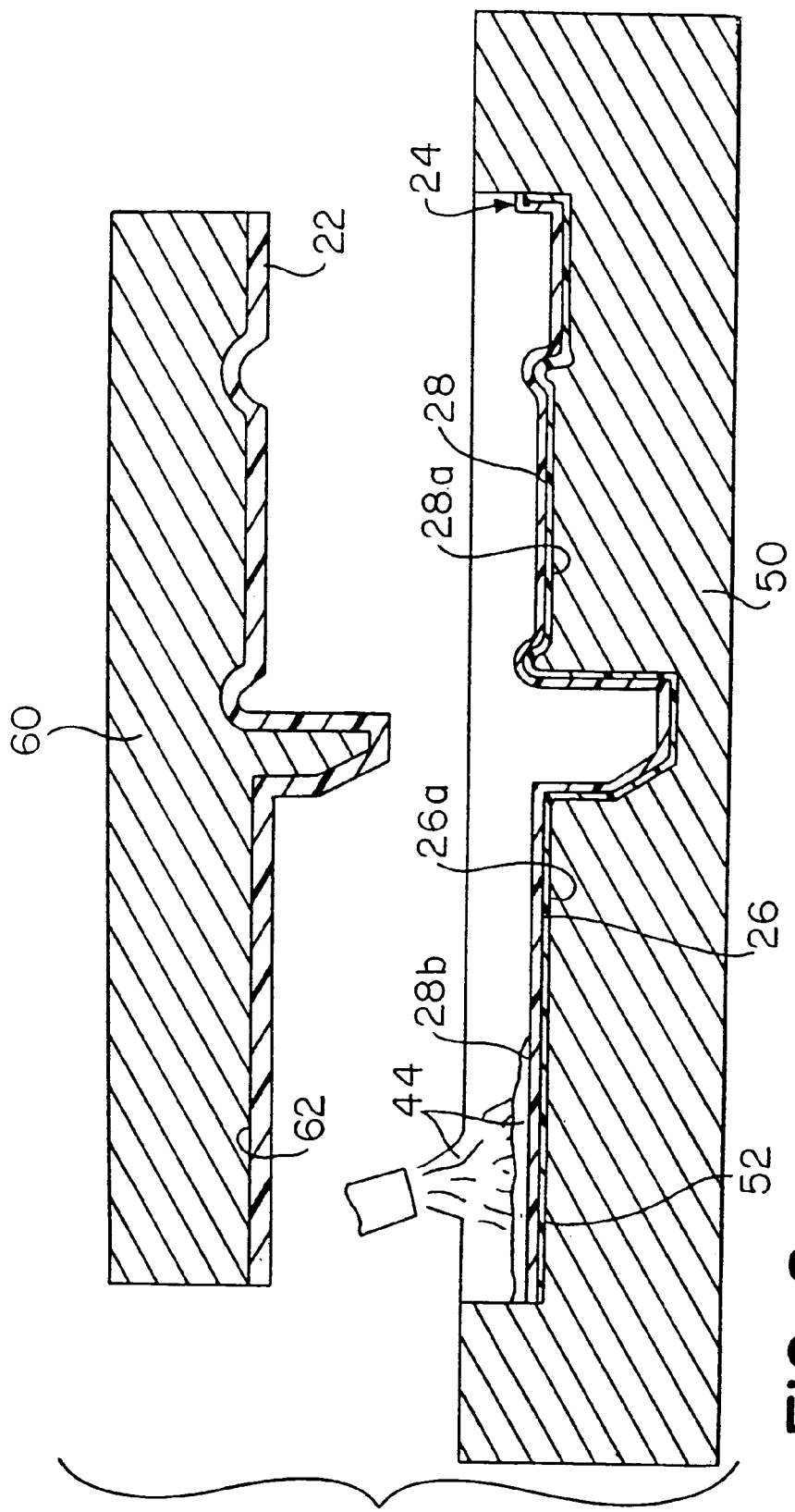
FIG. 8 is a sectional view of a second mold surface showing a step of obtaining a relatively rigid polyurethane cellular foam intermediate layer by applying a reaction mixture to the inner layer while the combination of the inner and outer layers are disposed on a second mold surface in accordance with an embodiment of the method of the present invention.

After the layered composite structure 24 is demolded from the first mold surface 34 and examined, the layered composite structure 24 is placed on a second mold surface 52 of a second mold part 50. As shown in FIG. 8, the second mold surface 52 also is shaped to define a corresponding configuration of the outer layer 26.

Then, a reactive mixture 44 for forming a semi-rigid cellular foam, such as a polyurethane semi-rigid cellular foam, is applied to an inner surface 28b of the inner layer 28 while the composite structure 24 is disposed on the second mold surface 52 to form the intermediate layer 30. The reactive mixture 44 can be applied, for instance, by employing high impingement mixing and a mixed-head nozzle. The second mold component 50 is generally heated to a temperature in a range of from about 40° C. to about 60° C., and more preferably in a range of from about 40° C. to about 50° C., during application of the reactive mixture. The mixture 44, which is typically relatively viscous, is in a transient state of reaction during application to the second mold component 50 and begins to foam within seconds of application.

Although the desired thickness of the intermediate layer is partially dependent upon the intended use of the panel-like structure 10, generally the intermediate layer has a thickness in a range of from about 5 mm to about 12 mm.

Figure 9:
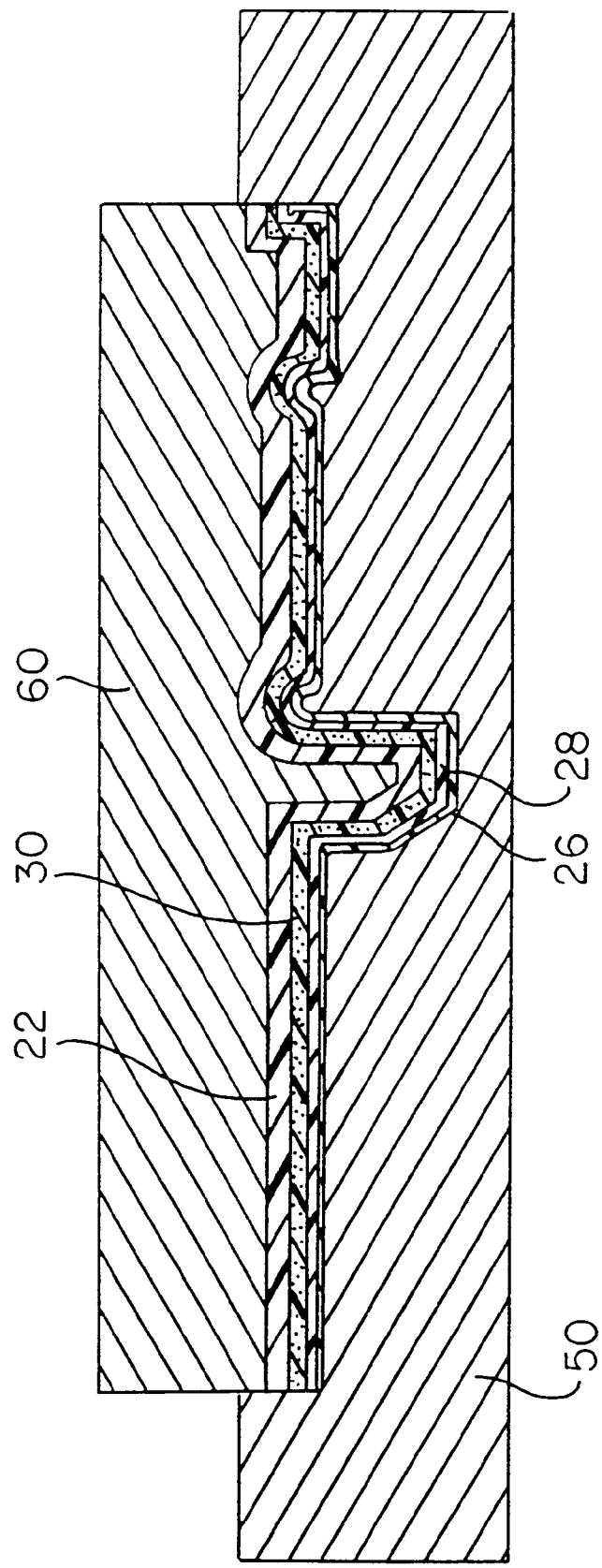
FIG. 9 is a sectional view showing a step of uniting the combination of the inner and outer layers on the second mold surface with a preformed relatively rigid substrate disposed on a third mold surface.

Once the reactive mixture 44 has been applied to the layered composite structure 24 located on the second mold surface 52, a third cooperating mold part or component 60 carrying the pre-formed rigid substrate 22 is moved into cooperating relation with the second mold component 50, as shown in FIG. 9. The third mold component 60 has a third mold surface 62 (FIG. 8) which is shaped to define the interior surface 10b of the panel-like structure 10. Thereafter, the reactive mixture 44 is foamed and cured, preferably under heat of approximately 110° F. (43.3° C.) and a self-generated cavity pressure of about 0.8 atm to form the intermediate layer 30. The semi-rigid polyurethane cellular foam serves to unite the layered composite structure 24 with the pre-formed rigid substrate 22 disposed on a third mold surface 62. The panel-like structure including the combination of the layered composite structure 24, the rigid substrate 22, and the intermediate layer 30 then can be removed from the mold parts 50 and 60 and additional components, such as the rug section 20, can be affixed.

In its broadest aspects, several variations and modifications to the above-discussed article can be implemented without departing from the scope of the present invention. For example, the layered composite structure 24 and/or the intermediate layer 30 can be eliminated from the hidden lower planar rug receiving portion 18 (or other portions that are hidden from the vehicle interior when the panel-like structure is mounted in the automobile vehicle) of the resultant panel-like structure 10 depicted in FIG. 1 so that the lower planar rug receiving portion 18 is characterized by having the rigid substrate 22 directly adjacent to the rug section 20.

According to another variant embodiment of the present invention, a non-foamable adhesive can be selected for uniting the layered composite structure 24 to the rigid substrate 22.

In accordance with yet another variant embodiment, multiple water-dispersed compositions containing different coloring agents can be respectively applied to different portions of the panel-like structure to produce discretely masked colors. Where the selected color or colors are to be changed, in practice it has been found that minimal downtime (on the order of about 0.5 hours) is required.

In accordance with still another variant embodiment, the outer layer 26 can exhibit a dualtone or multitone appearance. This variant embodiment can be accomplished, for example, by abrasive treatment of a portion of the mold surface of the tooling. The greater the amount of abrasive treatment, the duller the appearance of the outer layer 26. A dualtone appearance can be especially desirable for instrument panels, since the upper region of an instrument panel generally should have a low gloss in order to reduce reflectance and veiling glare.

Several variations and modifications to the above-discussed method also can be practiced without departing from the scope of the present invention. For example, as mentioned above, the layered composite structure 24 can be retained in the first mold component 32 instead of being demolded and transferred to a second mold component 50 for the uniting step. In accordance with another variant embodiment of the present invention, the layered composite structure 24 can be returned to the first mold component 32 after being examined and treated.

In accordance with another variant of the present invention, a secondary or alternative heat source can be applied for activating the reaction between the light-stable aliphatic thermoplastic polyurethane and the heat-activated reactive crosslinking monomer. For example, the water-dispersed composition 36 can be preheated before being applied to the first mold surface 34, such that the first mold surface 34 does not have to be heated to initiate the reaction between the heat-activated reactive crosslinking monomer and the light-stable aliphatic thermoplastic polyurethane.

In accordance with yet another variant embodiment of the present invention, the reactive mixture 44 for forming the polyurethane semi-rigid cellular foam 30 can be applied to the surface of the rigid substrate 22 instead of the layered composite structure 24. Alternatively, the second and third mold components 50 and 60 can be cooperatively engaged to define a cavity between the inner surface 28b of the inner layer 28 and the outer surface of the substrate 22, with the reactive mixture 44 thereafter being injected between the rigid substrate 22 and the composite 24.

In order to further elucidate the decorative automotive interior trim article and method of the present invention, the following discussion specifies suitable and preferred constituents and conditions for making the article of the present invention and for carrying out the process of the present invention.

The water-dispersed composition 36 used to prepare the outer layer 26 comprises at least one light-stable aliphatic thermoplastic polyurethane, at least one desired coloring agent, and at least one reactive crosslinking monomer. The light-stable aliphatic thermoplastic polyurethane is preferably prepared from a high molecular weight aliphatic thermoplastic polyurethane containing hydroxyl and/or carboxyl pendent functional groups which are chemically reactive with the carbodiimide. The molecular weight of the thermoplastic polyurethane preferably is in a range of from about 5000 to about 7000, and more preferably about 6000. An exemplary water dispersed composition containing a thermoplastic polyurethane and carbodiimide can be obtained from C.F. Jameson & Company, Inc. of Bradford, Mass. under the trade designation JAMESON WVF SERIES FLEXCOAT IMC. The desired weight ratio of thermoplastic polyurethane to carbodiimide for this particular composition is about 8 to 1 by volume (equivalent ratio of 1.44 thermoplastic polyurethane to 1.08 carbodiimide on a dry basis).

The water-dispersed composition 36 can be prepared by providing thermoplastic polyurethane component as a colloidal solution in a solvent such as N-methyl pyrrolidone, then dispersing the solution by adding water, the coloring agent, and conventional additives, if desired. Sufficient water can be added so that the solvent concentration in the water-dispersed composition 36 is about 13.9% by weight, and about 35% by weight after drying.

The optional additives in the water-dispersed composition 36 can include, without limitation, any combination of the following: heat and ultra-violet light stabilizers, pH stabilizers to maintain an alkaline state of dispersion, plasticizers, antioxidants, dulling agents, surfactants, colloidal protectants to maintain particles in suspension, carbon black, thixotropic agents (e.g., hydroxy methyl cellulose), and fillers such as clay particles.

The water-dispersed composition 36 can contain, for example, about 20% to about 30% solids by weight, and more preferably about 24% solids by weight, about 10% to about 80% water by weight, and more preferably about 50% water by weight, and about 9 to 15% solvents by weight, depending on desired color and additives. An insufficient amount of water in the composition 36 can adversely affect the viscosity of the composition 36 and thus adversely affect the application of the water-dispersed composition 36 onto the mold surface 34. On the other hand, an excess amount of water in the composition 36 can significantly alter the sprayability and coating efficiency of the water-dispersed composition 36.

To the thermoplastic polyurethane solution is added a solution of the carbodiimide, which can include, for example, glycol ether acetate and/or xylene as the solvent. When combined and activated with heat, the reactive crosslinking monomer preferentially reacts with the hydroxyl and/or carboxyl groups of the thermoplastic polyurethane to crosslink the thermoplastic polyurethane with itself or with polyol constituents of the rapidly reacting composition 42.

Exemplary polyisocyanates that can be selected for the rapidly reacting composition 42 employed to prepare the inner layer 28 include polyisocyanates having closed aliphatic ring structures with pendent —NCO groups, such as isophorone diisocyanate, which can be obtained from Recticel under the tradename ISOFAST. Also suitable is tetramethyl xylene diisocyanate, which can be obtained from Texaco under the tradename TMXDI. Non-light stable aromatic polyisocyanates are more desirable than currently available aliphatic polyisocyanates because of their lower costs, more predictable reactivity, and higher tear strength in comparison to light-stable aliphatic polyisocyanates.

Suitable polyols for this rapidly reacting composition 42 include, without limitation, polyether polyols having molecular weights in a range of from about 220 to about 250 and containing one or more pendent hydroxyl and/or carboxyl groups (in addition to primary hydroxyl groups), which can chemically react with unreacted functional —NH groups of the carbodiimide and the hydroxyl and/or carboxyl pendent functional groups of the polyurethane of the outer layer 26. An exemplary polyol is POLYFAST from Recticel.

The rapidly reacting composition 42 can also contain appropriate additives, including, by way of example and without limitation, any combination of the following: heat and ultra-violet light stabilizers, pH stabilizers, antioxidants, dulling agents, surfactants, carbon black, chain extenders (e.g., ethylene glycol), thixotropic agents (e.g., amorphous silica), fillers such as clay particles, and catalysts such as tin catalysts (e.g., dibutyl tin dilaurate).

Various blends of polyether polyols and polyisocyanates having suitable resilience properties can be employed to form the semi-rigid polyurethane cellular foam of the intermediate layer 30. For example, the polyisocyanate blend can include methylene diisocyanate. The semi-rigid polyurethane cellular foam also can contain appropriate additives, including, by way of example and without limitation, any combination of the following: surfactants, antioxidants, fillers, stabilizers, catalysts such as tin catalysts (e.g., dibutyl tin dilaurate) and tertiary amines (e.g., diethanolamine), and small amounts of foaming agents such as water. In this regard, it is noted that the condensation reaction between the blends of polyols and polyisocyanates releases water, which reacts with the polyisocyanate to generate carbon dioxide and thereby impart the cellular structure to the intermediate layer 30. Accordingly, a slightly stoichiometric excess of polyol can be provided to form the semi-rigid polyurethane cellular foam.

The rigid substrate 22 can be selected from any material possessing the requisite strength to reinforce and mount the outer layer 26, inner layer 28, and intermediate layer 30. Suitable materials include any material with sufficient rigidity to permit the composite to be mounted into a vehicular sub-structure, including, by way of example, injection molded thermoplastics, such as, without limitation, a styrene maleic anhydride (SMA), acrylonitrile butadiene styrene (ABS), polycarbonates (PC), an alloy of ABS-PC, reinforced reaction injection molded polyurethanes (RRIM), metals, metal alloys, wood-fiber composites, or any combination thereof.

Figure 2:
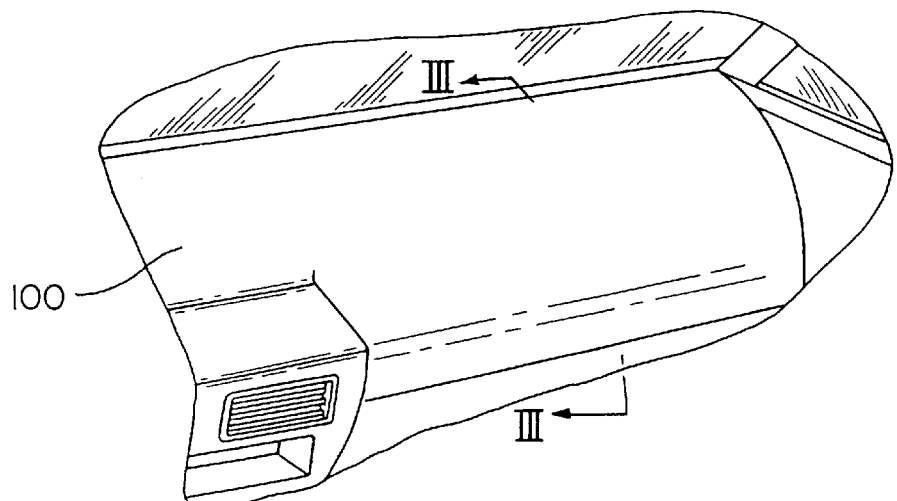
FIG. 2 is a perspective view of a completed vehicle instrument panel constructed in accordance with the present invention.
Figure 3:
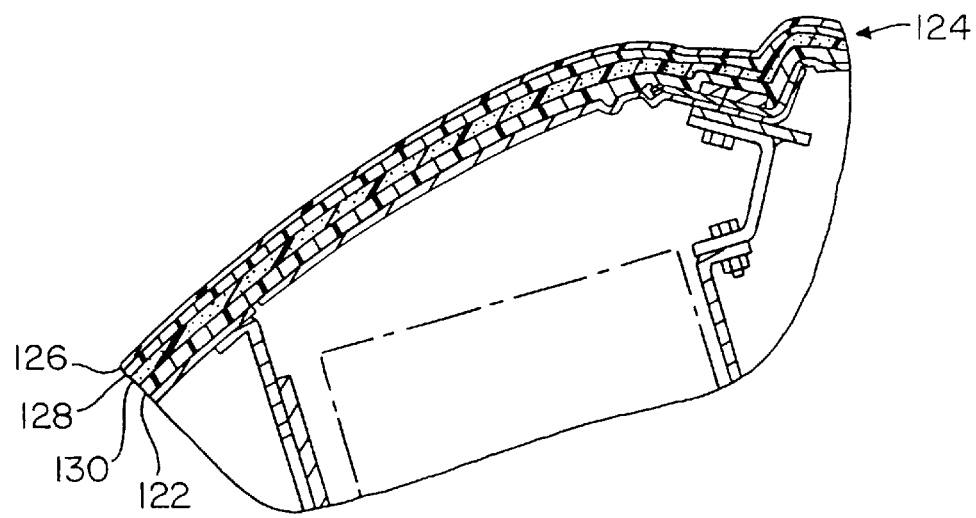
FIG. 3 is a sectional view of the instrument panel of FIG. 2 taken along line III—III.

Although the method of the present invention has been embodied above in connection with the preparation of a door panel, it is understood that the method is equally applicable to other panel-like structures, including for example instrument panels, armrests, headrests, floor consoles, knee bolsters, and glove compartment doors. An instrument panel prepared in accordance with the method of the present invention is illustrated in perspective and cross-sectional views in FIGS. 2 and 3, respectively, and is generally designated by reference numeral 100. The instrument panel 100 is shown in cross-section in FIG. 3, and includes a rigid substrate 122, an outer layer 126 and an inner layer 128 (collectively a layered composite structure, generally designated by reference numeral 124), and an intermediate layer 130.

The complete disclosures of any United States or foreign patents or patent applications mentioned or cited hereinabove are hereby incorporated by reference into the present specification.

It will thus be seen that the objectives and principles of this invention have been fully and effectively accomplished. It will be realized, however, that the foregoing preferred specific embodiments have been shown and described for the purpose of this invention and are subject to change without departure from such principles. Therefore, this invention includes all variations, modifications, and improvements encompassed within the spirit and scope of the appended following claims.

What is claimed is:

1. An article comprising a panel structure mountable in an automobile vehicle to form a part of the interior thereof, the panel structure having an exterior surface exposed to the vehicle interior and an interior surface which is hidden from the vehicle interior when the panel structure is mounted in the automobile vehicle, said panel structure comprising:

a rigid substrate having one surface defining said interior surface;

a layered composite structure comprising an outer layer defining at least a portion of said exposed exterior surface of the panel structure and an inner layer, said layered composite structure being united with an opposite surface of said rigid substrate so that said rigid substrate serves to reinforce said outer layer while retaining the touch and color of the exposed portion;

said outer layer having the touch, color, and configuration of said panel structure and comprising an at least substantially dried, light-stable, crosslinked polyurethane formulated from a water-dispersed composition comprising at least one desired coloring agent, at least one light-stable aliphatic thermoplastic polyurethane containing at least one pendent functional group selected from the group consisting of hydroxyl and carboxyl functional groups, and a heat-activated crosslinker, said at least one light-stable aliphatic thermoplastic polyurethane being molded with and crosslinked by the heat-activated crosslinker on a mold surface shaped to define a corresponding configuration of said outer layer and also being dried on the mold surface; and said inner layer being thicker than said outer layer and comprising a polyurethane elastomer formulated from a rapidly reacting composition containing at least one polyisocyanate and at least one polyol, said polyurethane elastomer being crosslinked with the polyurethane of the outer layer via said heat-activated crosslinker such that said inner layer has a surface adjacent to and interfacially chemically bonded with an inner surface of said outer layer, said inner layer and said interfacial chemical bonds being formed by spraying said rapidly reacting composition onto said inner surface of said outer layer while the outer layer is on said mold surface.

2. An article according to claim 1, wherein the heat-activated crosslinker is carbodiimide.

3. An article according to claim 2, wherein said polyol contains one or more pendent hydroxyl, carboxyl, or hydroxyl and carboxyl functional groups.

4. An article according to claim 3, further comprising a relatively rigid polyurethane cellular foam interposed between said layered composite structure and said rigid substrate that adheres said layered composite structure to said rigid substrate, wherein said outer layer is provided with a compressing feel by said relatively rigid polyurethane cellular foam and said inner layer.

5. An article according to claim 4, wherein said outer layer has a thickness in a range of from about 1.0 mils to about 1.5 mils.

6. An article according to claim 4, wherein said inner layer has a thickness in a range of from about 40 mils to about 60 mils.

7. An article according to claim 4, wherein said at least one light-stable aliphatic thermoplastic polyurethane and said heat-activated crosslinker can be premixed and stably stored for at least up to 24 hours at room temperature.

8. An article according to claim 4, wherein said panel structure is a door panel.

9. An article according to claim 4, wherein said panel structure is an instrument panel.

10. An article according to claim 1, wherein said water-dispersed composition further comprises a solvent comprising N-methyl pyrrolidone.

11. An article according to claim 1, wherein said water-dispersed composition further comprises at least one solvent selected from the group consisting of glycol ether acetate and xylene.

* * * * *